Patented Sept. 25, 1928.

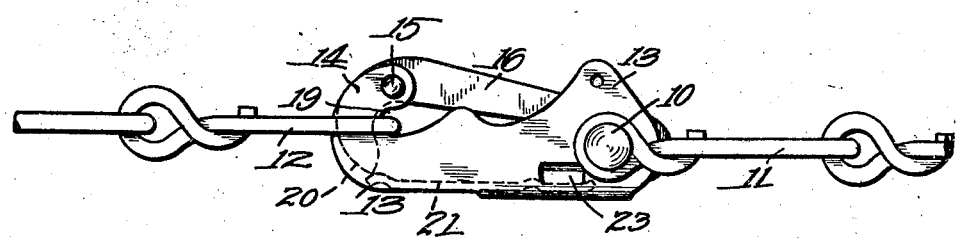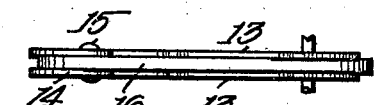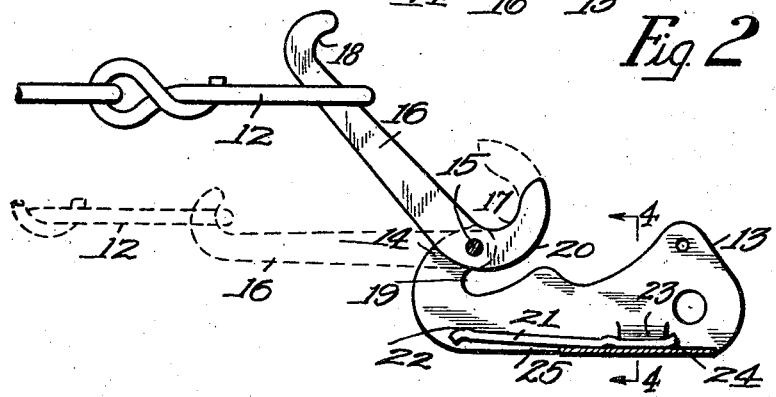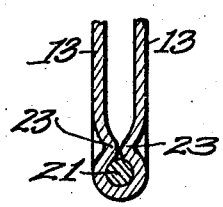

1,685,201

UNITED STATES PATENT OFFICE.

HENRY ST. PIERRE, OF WORCESTER, MASSACHUSETTS, ASSIGNOR TO ST. PIERRE CHAIN CORPORATION, OF WORCESTER, MASSACHUSETTS, A CORPORATION OF MASSACHUSETTS.

SNAP HOOK.

Application filed August 4, 1927. Serial No. 210,656.

This invention relates to a fastening device for connecting the ends of two chains together, of the snap-hook type in which the turning of the locking lever over will hold it in such a way that it will not be likely to become accidentally unhooked and the pull of the chain will hold the locking lever in closed position.

The principal object of the invention is to provide a snap-hook of this kind with an improved and simplified spring for holding the locking lever and with improved means for holding the spring in position in a simple manner in the frame or casing of the hook.

Other objects and advantages of the invention will appear hereinafter.

Reference is to be had to the accompanying drawings, in which

Fig. 1 is a side view of a snap-hook for securing the ends of two chains together, shown in locked position.

Fig. 2 is a plan or edge view of the same;

Fig. 3 is a central longitudinal sectional view of the same but shown in unlocked or open position, and Fig. 4 is a transverse sectional view, on enlarged scale, on the line 4—4 of Fig. 3.

As stated, this invention relates to a locking or connecting device adapted to be attached by a pin 10 to the end of a chain 11 and designed for connecting that with a link 12 constituting the end of another chain. The connecting device comprises a sheet metal casing or frame 13 which is bent up double and has two parallel sides of the same outline and spaced apart. The pin 10 passes through the two sides and is pivotally connected with the end of the chain 11 as stated and is supported by the frame. The other end of the frame is shaped in the form of a hook 14, to the end of which at 15 is pivoted a locking lever 16. This lever has a notch 17 at one end and notch 18 at the other while the frame 13 has a notch 19. Each of these notches constitutes a hook.

For the purpose of engaging the convex surface 20 outside the notch 17 and holding the latch locked under spring pressure I provide a spring consisting simply of a substantially straight piece of wire 21 having a hump 22 at its locking end. It is adapted to be pressed between two longitudinally extending ridges 23 formed in the sides of the frame 13 to hold it permanently rigidly in position therein. The wire is offset at 24 so that it will not pull through the space between the ridges 23.

In manufacture, this spring is set in position by simply exerting pressure on the opposite side of the casing 13 at opposite points to project inwardly these ridges 23 and firmly set the sheet metal of the casing around the wire spring to hold it in position. The bottom of the frame or casing is cut out at 25 to let the spring have freedom of movement.

In using the device, it is first set in the position shown in Fig. 3 but, of course, with a chain attached thereto by the pin or stud 10. The chain 12 to be attached at the other end is merely passed over the outer end of the locking lever and then this lever is turned on its pivot toward the position shown in Fig. 1. This brings the end of the link of the chain 12 down into the notch 19 and the end having the notch 18 is brought down over the shank of the stud 10 as shown in Fig. 1. When it gets to a point at which the end of the surface 20 passes over the hump 22 it is locked in that position.

It will be noticed that the convex end of the lever outside of the notch 18 projects beyond the end of the frame 13 at this point so that it will be readily accessible for the application of pressure to open it. Pressure is applied best by the use of the thumb pressed upwardly upon it. It has to resist the resiliency of the spring 21 in allowing the other end of the locking lever to pass over it.

As shown in the dotted line position in Fig. 3 the hook 18 is provided so that it can be engaged over the end link of a chain which does not reach far enough and then the hook employed to move the chain back and forth and put it forward so as to take up the slack. This is necessary often because a chain is not laid straight on the tire and will come forward into position to reach the hook if it is subjected to a strong pull and moved back and forth on the tire. This gives a good hold to enable the operator to accomplish that result. Then the hook is turned over about its pivot and the chain will come down into the notch 17 and then back into place as shown in Fig. 1.

The pivot pin 15 is placed a little forward of the hump 22, that is, in a vertical plane between that hump and the opposite end of the hook so that when the hook is closed, the pressure of the spring is exerted on its convex eccentric surface beyond its pivot 15, thus offering a defiinite resistance against the opening of the hook. This is shown in dotted lines in Fig. 1.

This constitutes a very simple construction, particularly the spring 21 and the way it is secured in position in the sheet metal casing in the frame. It has nothing that is likely to get out of order by the rough usage to which these articles are put and it serves every purpose which more expensive devices of this kind are capable of accomplishing. It will be noticed that when in the locked position 21 any pull on the chain 12 tends to swing the locking lever 16 toward locking position and it therefore cannot be unlocked when there is any strain on the chain. Also the chain link 12 is held by the fixed hook 14 instead of being held by the lever.

Although I have illustrated and described only one form of the invention I am aware of the fact that modifications can be made therein by any person skilled in the art without departing from the scope of the invention as expressed in the claims. Therefore, I do not wish to be limited in these respects, but what I do claim is:

1. As and article of manufacture, a snap-hook comprising a casing formed of a piece of sheet metal doubled on itself to provide two parallel walls spaced apart, a locking lever located between said walls, a wire spring having a hump for engaging the end of said lever in closed or locking position, preventing its accidental disengagement, the casing being bent in on opposite sides to clamp the shank of said spring in position between the sides of the casing, the casing being cut out under the free end of the spring to give it space for motion.

2. As an article of manufacture, a chain locking device comprising a casing formed of a piece of sheet metal doubled on itself to provide two parallel walls spaced apart, a lever located between said walls and having a hook projecting from its pivot for receiving one of the chains, a wire spring having a hump for engaging the end of said hook when the lever is in closed or locking position, preventing its accidental disengagement, the casing being bent in on opposite sides to clamp the shank of said spring in position between the sides of the casing, the casing being cut out under the free end of the spring to let the end of the lever pass.

3. As an article of manufacture, a chain locking device comprising a casing, a lever having a hook projecting from its pivot for receiving one of the chains, a wire spring having a hump for engaging the end of said hook when the lever is in closed or locking position, preventing its accidental disengagement, the casing being bent in on opposite sides to clamp the shank of said spring in position between the sides of the casing.

In testimony whereof I have hereunto affixed my signature.

HENRY ST. PIERRE.